Aug. 30, 1932.  E. L. BARNES  1,875,211
REFRIGERATING APPARATUS AND METHOD OF REFRIGERATING
Filed Aug. 27, 1929  2 Sheets-Sheet 2
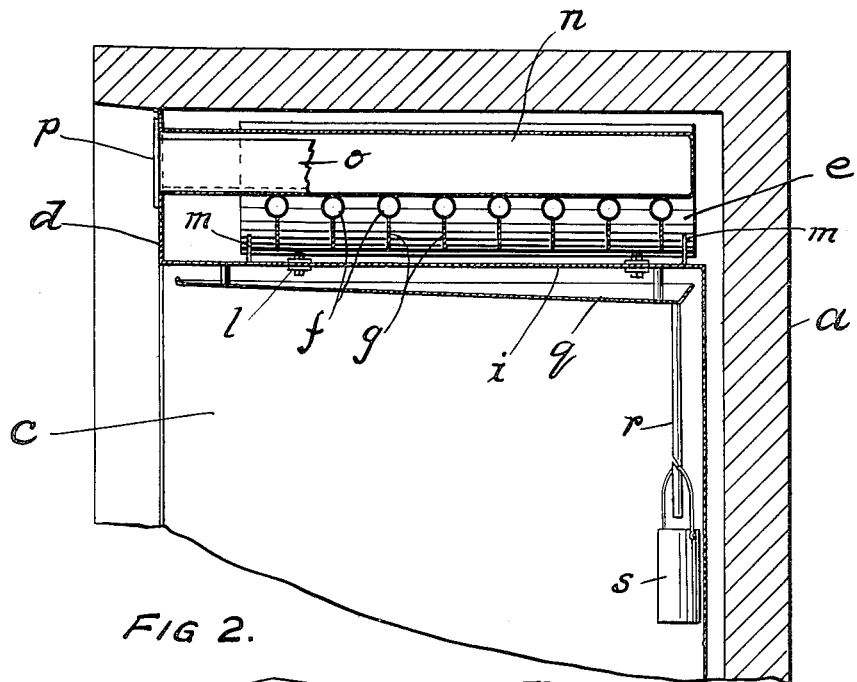
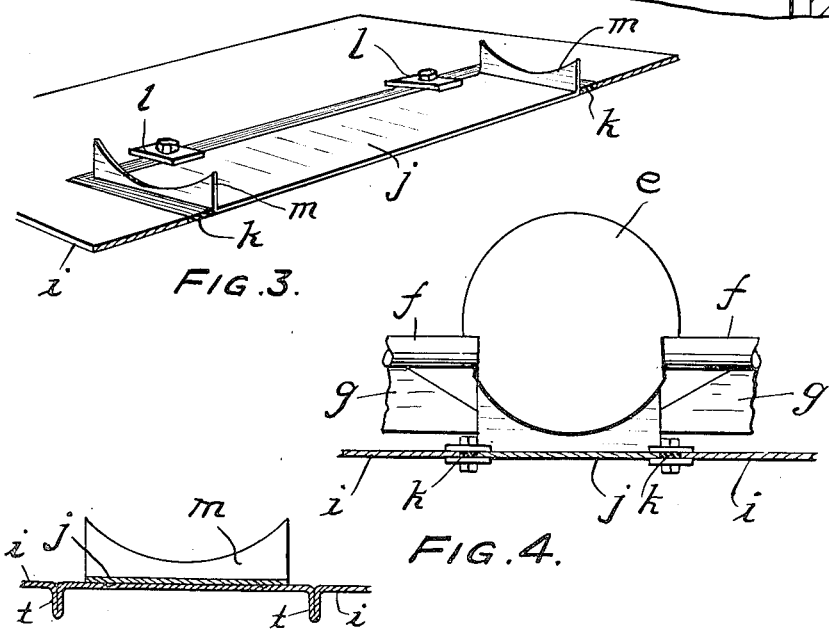
INVENTOR
Eugene L. Barnes
BY
ATTORNEYS.

Patented Aug. 30, 1932

1,875,211

UNITED STATES PATENT OFFICE

EUGENE L. BARNES, OF BUFFALO, NEW YORK

REFRIGERATING APPARATUS AND METHOD OF REFRIGERATING

Application filed August 27, 1929. Serial No. 388,666.

My invention relates to an improvement in refrigerating apparatus and method of refrigerating, and more particularly to that type of refrigerating apparatus adapted for home use.

Refrigerating apparatus of the type to which my invention more particularly relates is open to the serious disadvantage that foods of various kinds placed therein suffer a loss of moisture and in the course of time become substantially dehydrated. The generally accepted cause of the dehydration of foods stored in refrigerating apparatus of the type to which my invention relates is the freezing out of moisture from the air in the food compartment in colder portions thereof, as about the boiler or refrigerating unit, which is customarily placed in the food compartment, and, as is well known, becomes heavily frosted. The air in the food compartment, on freezing out of moisture therefrom about the boiler or refrigerating unit, absorbs moisture from foods stored in the compartment in relatively warm portions; as remote from the cooling unit, which in turn is frozen out with absorption of further quantities of moisture from the foods, and so on, with eventual dehydration of the foods.

Various attempts have been made to provide against the loss of moisture by foods stored in such apparatus, but heretofore no successful solution of the problem has been developed.

Among the various suggested solutions of the problem, it has been suggested to effect cooling of the food compartment by conduction of heat through the walls of the compartment. However, such has not proved satisfactory, since, where the cooling is sought to be so effected, it is found that the walls of the food compartment sweat badly, as the result of condensation on the walls generally, as compared with condensation on or about the boiler or refrigerating unit.

Another substantial disadvantage found in refrigerating apparatus of the type to which my invention relates is that the moisture condensing from the air, on the boiler or refrigerating unit, becomes frozen and forms an ever-thickening coating of frost on the boiler or refrigerating unit, with reduction of its efficiency and requiring the apparatus to be "defrosted".

Now, in accordance with my invention, I provide refrigerating apparatus of the type adaptable for home use, though it may be adapted to any use, in which the dehydration of foods stored therein is substantially prevented and the disadvantage of frosting of the boiler or refrigerating unit, with consequent necessity for defrosting and condensation on the walls of the food compartment generally are avoided. In accordance with my invention, I provide apparatus in which the boiler or refrigerating unit is enclosed within a space formed by a casing or jacket about a food compartment, the space containing the boiler or refrigerating unit being hermetically sealed and without communication with either the food compartment or the atmosphere, the cooling of the food compartment being effected through conduction through its walls to air, in the space formed by the casing or jacket containing the boiler or refrigerating unit, which serves to extract the conducted heat from the air within the space; and there being provided a definite area in a wall of the food compartment which is colder, or has a greater heat conductive capacity, than any similar area of the walls otherwise, which may be provided by a plate let into a wall of the food compartment and contacted with the boiler or refrigerating unit, the plate being insulated from the wall, or by forming an area of one of the walls of a material of higher conductivity than that of the walls generally.

In the apparatus embodying my invention and in accordance with the method of refrigerating embodying my invention, adequate cooling of the food compartment is effected by conduction of heat through the walls of the compartment supplemented by the definite area of greater conductivity in one of the walls while, at the same time, condensation of moisture is induced over the definite area in one of the walls of greater heat conductive capacity than of the walls generally. The area of greater heat conductive capacity is in effect colder than any other similar area of the walls of the food compartment and hence induces condensation, with the prevention of condensation on any other area of the walls of the compartment, which being cooled throughout eliminate any substantial warm areas in which the air will have an increased capacity for moisture which will be satisfied by absorption of moisture from stored foods.

At the same time, since the boiler or refrigerating unit is without the food compartment and within a closed space, that is, one having no communication with the atmosphere or with the food compartment, the condensation of moisture thereon, with resultant frosting thereof, is limited to the moisture contained in the air initially sealed within the space and which is inconsequential. Hence, in the apparatus embodying my invention there is no necessity for defrosting the boiler or refrigerating unit.

Having now indicated in a general way the nature and purpose of my invention, I will proceed to describe in detail a preferred embodiment thereof, with reference to the accompanying drawings, in which:

Figure 2 is a sectional view on line 2—2 of Figure 1.

Figure 3 is a plan view partly in section of the top wall of a food compartment.

Figure 4 is a sectional view showing a detail of construction.

Figure 5 is a sectional view showing a modified detail of construction.

Figure 1:
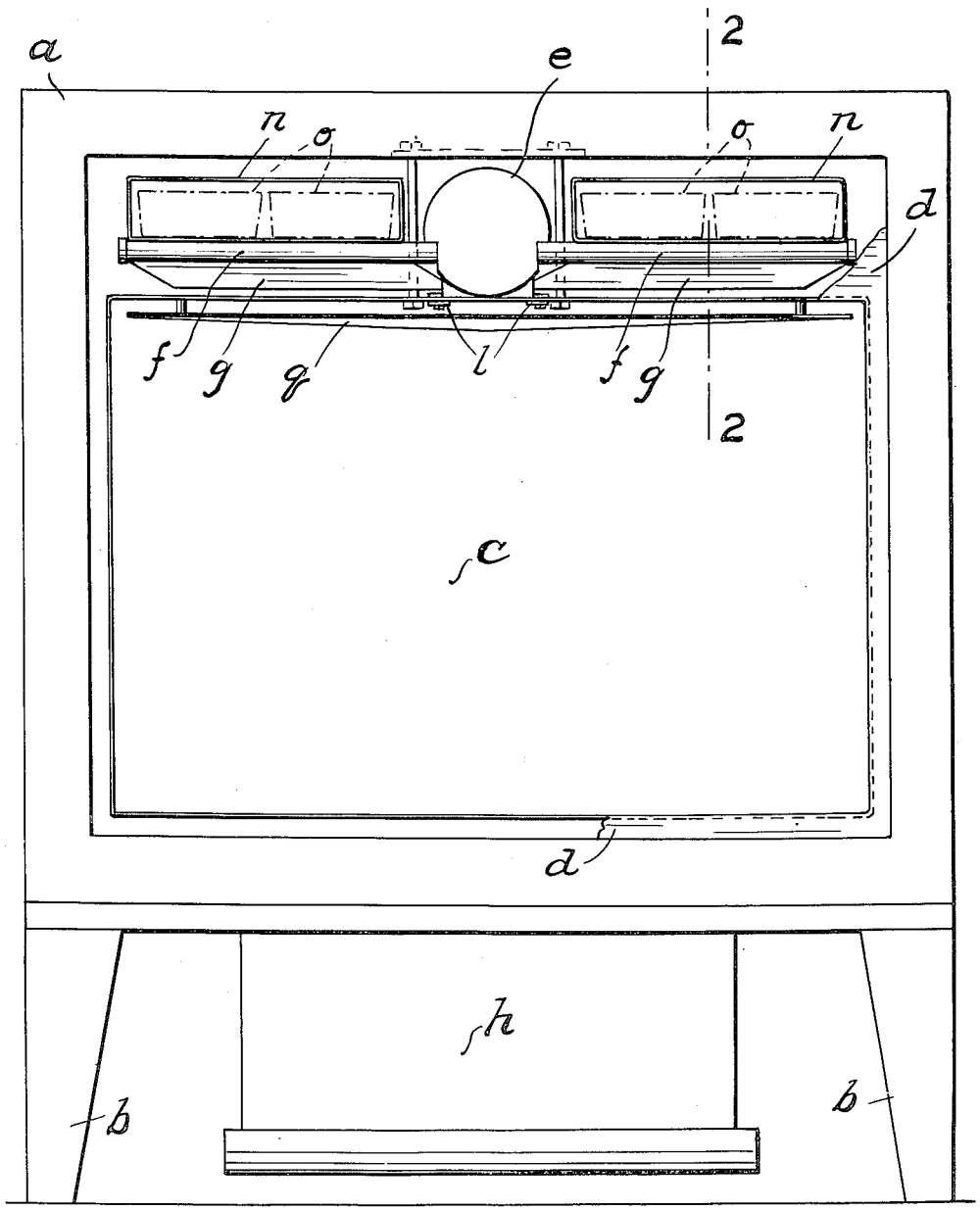
Figure 1 is a general front view of a refrigerating apparatus embodying my invention, the doors to the food compartment being omitted and the front plate being broken away.

In the drawings, $a$ indicates an insulated casing or jacket supported, for example, from the floor by means of legs $b$. Within the casing or jacket $a$, which is desirably made of nonconductive material is a food compartment $c$, formed from conductive material, as for example, any suitable metal, and having an open side corresponding to the open side in the casing or jacket $a$, and which is adapted to be closed by means of any suitable door or doors. Each of the walls of the food compartment $c$ is spaced from the inner surface of the casing or jacket $a$ to form an air space therebetween, the space being closed adjacent the open sides of the food compartment and casing or jacket by the application of a front plate $d$, desirably of bakelite, or other nonconducting material secured to the edges of the casing or jacket and of the walls of the food compartment adjacent their open sides. The plate is so secured as to effectively hermetically seal the space formed between the walls of the food compartment and the casing or jacket.

Within the space formed between the casing or jacket $a$ and the food compartment $c$ and preferably above the food compartment, is positioned a boiler or refrigerating unit $e$ supported from the casing and desirably having a cylindrical body provided with fins $g$. Beneath the casing $a$, or in other suitable position as desired, is mounted a motor driven compressor, etc., indicated at $h$, for the supply of a refrigerant to the boiler or refrigerating unit $e$.

The top wall $i$ of the food compartment $c$ is cut out over a definite area beneath the body of the boiler or refrigerating unit $e$, and a plate $j$, for example, oblong in shape, as illustrated in Fig. 3, inserted. Plate $j$ is made smaller than the cut-out portion of the wall $i$ and insulating material $k$ is inserted between the edges of the cut-out portion of the wall and the edges of the plate $j$, the insulating material and plate being secured to the wall $i$ by means of clamps $l$. The plate $i$ is conductively contacted with the body of the boiler or refrigerating unit $e$ in any suitable manner, as by being placed directly in contact therewith, or through the medium of cradles $m$ formed at opposite ends of the plate and contacted with the boiler.

Sealed to the plate $d$, in line with suitable apertures formed therein, are chambers $n$ desirably formed of metal and which extend over the laterally extending tubes $f$ of the boiler or refrigerating unit $e$ on opposite sides of the main body thereof for the reception of ice trays $o$ provided with end plates $p$, which serve, when the ice trays are positioned within the chambers, to close the apertures in the plate $b$. It will be noted that the chambers $n$ are positioned above and open externally of the food compartment.

Beneath the plate $j$ and within the food compartment is supported a drip pan $q$, provided with a drain pipe $r$ discharging into a bucket $s$ supported by its bail from a notch in the drain pipe adjacent its lower end.

As illustrated in Figure 5, the plate $j$, with which the boiler or refrigerating unit contacts, may be superimposed on the top wall of the food compartment, the top wall being provided with a downwardly extending flange $t$ formed by crimping the top wall. The plate $j$ cooled by contact with the boiler will supercool or increase the heat conductivity of a definite area of the top wall, while the flanges $t$ desirably positioned slightly beyond the supercooled area limits the flow of water of condensation along the top wall.

When the apparatus as above described is placed in operation, by the supply of refrigerant to the boiler or refrigerating unit $e$, the air sealed within the space between the casing or jacket $a$ and the walls of the food compartment $c$ is cooled by the boiler or refrigerating unit and absorbs heat from the food compartment by conduction through the walls thereof. The plate $j$ let into the top wall of the food compartment is directly cooled, due to its contact with the boiler or refrigerating unit, and is colder than the walls of the food compartment generally, which, as has been indicated, are cooled through the medium of air within the space between the walls of the compartment. When the apparatus is in operation the cold plate *j* supplements the cooling of the compartment by conduction through the walls and since it presents a colder area condensation of moisture will be induced over its surface to the exclusion of condensation on the walls of the food compartment generally and, since the boiler or refrigerating unit is within the hermetically sealed space formed between the walls of the food compartment and the casing, condensation of moisture on the boiler will be limited to the condensible moisture initially present in the air within the space. Further, it will be noted that the trays provided for freezing ice, while in indirect contact through chambers *n* with the boiler or refrigerating unit, are wholly without the food compartment, thus avoiding contamination of the ice produced with odors or bacteria.

It will be understood that the method and apparatus in accordance with my invention may be embodied in various ways and that I do not intend my invention shall be limited to the particular apparatus herein described for purposes of illustration.

What I claim and desire to protect by Letters Patent is:

1. In a refrigerating apparatus, in combination, a food compartment having an open side, a jacket surrounding and spaced from the walls of the food compartment, there being no communication between the space between the walls of the food compartment and said jacket and either the interior of the food compartment or the atmosphere, a gas contained in said space, and means for cooling the gas within said space, whereby the interior of the food compartment is cooled by conduction of heat therefrom through the walls thereof and means whereby a path of increased conductivity is afforded between one portion of the walls and the means for cooling the gas so that said portion will normally be at a lower temperature than other portions of the walls.

2. In a refrigerating apparatus, in combination, a food compartment having an open side, a jacket surrounding and spaced from the walls of the food compartment, there being no communication between the space between the walls of the food compartment and said jacket and either the interior of the food compartment or the atmosphere, and a refrigerating unit positioned wholly within said space and means affording a path of increased conductivity between said refrigerating unit and a point in one of the walls of said compartment.

3. In a refrigerating apparatus, in combination, a food compartment having an open side, a jacket surrounding and spaced from the walls of the food compartment, there being no communication between the space between the walls of the food compartment and said jacket and either the interior of the food compartment or the atmosphere, a refrigerating unit positioned wholly within said space, and means formed in one of the walls of said compartment affording a definite area having increased heat conductivity with the cooling means so that said area will normally be at a lower temperature than other portions of the walls.

4. In a refrigerating apparatus, in combination, a food compartment having an open side, a jacket surrounding and spaced from the walls of the food compartment, there being no communication between the space between the walls of the food compartment and said jacket and either the interior of the compartment or the atmosphere, and a refrigerating unit positioned wholly within said space and in metallic contact with a portion of one of the walls of the food compartment.

5. In a refrigerating apparatus, in combination, a food compartment having an open side, a jacket surrounding and spaced from the walls of the food compartment, there being no communication between the space between the walls of the food compartment and said jacket and either the interior of the food compartment or the atmosphere, and a refrigerating unit positioned wholly within said space and in contact with a section of one of the walls of the food compartment, said section being insulated from the remaining portion of the wall of which it forms a part.

6. In a refrigerating apparatus, in combination, a food compartment having an open side, a jacket surrounding and spaced from the walls of the food compartment, there being no communication between the space between the walls of the food compartment and said jacket and either the interior of the food compartment or the atmosphere, a plate of definite area let into the top wall of said food compartment and insulated therefrom, a refrigerating unit within said space and means affording conductive contact between said plate and said refrigerating unit.

7. In a refrigerating apparatus, in combination, a food compartment having an open side, a jacket surrounding and spaced from the walls of the food compartment, there being no communication between the space between the walls of the food compartment and said jacket and either the interior of the food compartment or the atmosphere, a refrigerating unit positioned wholly within said space, and a chamber positioned in metallic contact with the refrigerating unit and opening externally of the food compartment for the reception of ice trays.

8. The method of refrigerating a compartment adapted to contain food, which includes conducting heat from the compartment through the walls thereof and conducting heat from the compartment over a definite area of a wall thereof of less extent than the area of such wall at a more rapid rate than over any other similar area of the walls.

9. The method of refrigerating a compartment adapted to contain food which includes conducting heat from the compartment through the walls thereof and inducing condensation of moisture from the air in said compartment on a definite portion of one of the walls thereof of less extent than the area of such wall.

10. In a refrigerating apparatus, in combination, a food compartment having an open side, a jacket surrounding and spaced from the walls of the food compartment, there being no communication between the space between the walls of the food compartment and said jacket and either the interior of the food compartment or the atmosphere, a cooling fluid in said space and means affording a metallic path of maximum heat conductivity from a portion of one of the walls of said food compartment, so that said portion will normally be at a lower temperature than other portions of the walls.

11. In a refrigerating apparatus, in combination, a food compartment having an open side, a jacket surrounding and spaced from the walls of the food compartment, there being no communication between the space between the walls of the food compartment and said jacket and either the interior of the food compartment or the atmosphere, refrigerating means located in said space including a cooling fluid, and means affording a maximum heat conductivity from a portion of one of the walls of said food compartment to the refrigerating means, so that said portion will normally be at a lower temperature than other portions of the walls.

In testimony of which invention, I have hereunto set my hand, at Buffalo, New York, on this 21st day of August, 1929.

EUGENE L. BARNES.